US008781888B1

(12) United States Patent
Snyder et al.

(10) Patent No.: US 8,781,888 B1
(45) Date of Patent: *Jul. 15, 2014

(54) RELEASE ADVERTISEMENT SYSTEM

(75) Inventors: Luke Aron Snyder, Seattle, WA (US); Stephan G. Betz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/024,238

(22) Filed: Feb. 9, 2011

Related U.S. Application Data

(62) Division of application No. 11/692,634, filed on Mar. 28, 2007.

(51) Int. Cl.
*G06Q 30/00* (2012.01)

(52) U.S. Cl.
USPC ............................................ 705/14

(58) Field of Classification Search
USPC ............................................ 705/14
See application file for complete search history.

(56) References Cited

U.S. PATENT DOCUMENTS

| 5,615,109 | A | 3/1997 | Eder |
| 5,937,392 | A | 8/1999 | Alberts |
| 6,078,866 | A | 6/2000 | Buck et al. |
| 6,128,651 | A | 10/2000 | Cezar |
| 6,269,361 | B1 | 7/2001 | Davis et al. |
| 6,591,248 | B1 | 7/2003 | Nakamura et al. |
| 6,763,362 | B2 | 7/2004 | McKeeth |
| 6,826,572 | B2 | 11/2004 | Colace et al. |
| 6,915,294 | B1 | 7/2005 | Singh et al. |
| 6,920,464 | B2 * | 7/2005 | Fox ................................ 707/732 |
| 6,963,863 | B1 | 11/2005 | Bannon |
| 6,978,263 | B2 | 12/2005 | Soulanille |
| 7,031,932 | B1 | 4/2006 | Lipsky et al. |
| 7,035,812 | B2 | 4/2006 | Meisel et al. |
| 7,043,450 | B2 | 5/2006 | Vélez et al. |
| 7,076,443 | B1 | 7/2006 | Emens et al. |
| 7,080,073 | B1 | 7/2006 | Jiang et al. |

(Continued)

FOREIGN PATENT DOCUMENTS

WO  WO 97/22066 A1  6/1997

OTHER PUBLICATIONS

International Search Report mailed on Jun. 23, 2006, for International Application No. PCT/US2005/028148 filed on Aug. 8, 2005, 1 page.

(Continued)

*Primary Examiner* — Saba Dagnew
(74) *Attorney, Agent, or Firm* — Novak Druce Connolly Bove + Quigg LLP

(57) ABSTRACT

A new release advertisement system generates advertisement sets for new release items that have a release date. To generate the advertisement sets, the system identifies items with release dates within a "new release advertising window." The new release advertisement system then identifies item and keyword pairs from the text within the attributes of the items. After identifying item and keyword pairs for each of the new release items, the system removes pairs that do not satisfy a filtering criterion. The system then generates advertisements from the text of the attributes of the items remaining after the removing based on the filtering criterion. The system then creates advertisement sets for the remaining pairs that include the advertisement generated for the item of the pair and the keyword of the pair.

20 Claims, 9 Drawing Sheets

(56) References Cited

U.S. PATENT DOCUMENTS

| | | |
|---|---|---|
| 7,225,182 B2 | 5/2007 | Paine et al. |
| 7,346,839 B2 | 3/2008 | Acharya et al. |
| 7,363,254 B2 | 4/2008 | Skinner |
| 7,376,588 B1 * | 5/2008 | Gregov et al. ............... 705/27.1 |
| 2001/0053999 A1 | 12/2001 | Feinberg |
| 2002/0024532 A1 | 2/2002 | Fables et al. |
| 2002/0094868 A1 | 7/2002 | Tuck et al. |
| 2002/0103698 A1 | 8/2002 | Cantrell |
| 2003/0078913 A1 | 4/2003 | McGreevy |
| 2003/0105677 A1 | 6/2003 | Skinner |
| 2003/0120626 A1 | 6/2003 | Piotrowski |
| 2003/0120641 A1 | 6/2003 | Pelletier |
| 2003/0216930 A1 | 11/2003 | Dunham et al. |
| 2004/0030556 A1 | 2/2004 | Bennett |
| 2004/0044571 A1 | 3/2004 | Bronnimann et al. |
| 2004/0044574 A1 | 3/2004 | Cochran et al. |
| 2004/0088241 A1 | 5/2004 | Rebane et al. |
| 2004/0133469 A1 | 7/2004 | Chang |
| 2004/0162757 A1 | 8/2004 | Pisaris-Henderson et al. |
| 2004/0243581 A1 | 12/2004 | Weissman et al. |
| 2004/0267806 A1 | 12/2004 | Lester |
| 2005/0065806 A1 | 3/2005 | Harik |
| 2005/0071325 A1 | 3/2005 | Bem |
| 2005/0097024 A1 | 5/2005 | Rainey |
| 2005/0114198 A1 | 5/2005 | Koningstein et al. |
| 2005/0120311 A1 | 6/2005 | Thrall |
| 2005/0137939 A1 | 6/2005 | Calabria et al. |
| 2005/0144068 A1 | 6/2005 | Calabria et al. |
| 2005/0144069 A1 | 6/2005 | Wiseman et al. |
| 2005/0149388 A1 | 7/2005 | Scholl |
| 2005/0149390 A1 | 7/2005 | Scholl et al. |
| 2005/0160002 A1 | 7/2005 | Roetter et al. |
| 2005/0216230 A1 | 9/2005 | Gunzert et al. |
| 2005/0216335 A1 | 9/2005 | Fikes et al. |
| 2005/0216516 A1 | 9/2005 | Calistri-Yeh et al. |
| 2005/0228797 A1 | 10/2005 | Koningstein et al. |
| 2005/0246230 A1 * | 11/2005 | Murray ........................... 705/14 |
| 2005/0267872 A1 | 12/2005 | Galai et al. |
| 2006/0041480 A1 | 2/2006 | Briggs |
| 2006/0041536 A1 | 2/2006 | Scholl et al. |
| 2006/0161635 A1 | 7/2006 | Lamkin et al. |

OTHER PUBLICATIONS

International Search Report mailed on Nov. 22, 2006, for International Application No. PCT/US2004/044021 filed on Dec. 29, 2004, 2 pages.

Charlwood, W., "AdWords bid price; Facts about AdSense.com—Publishers and Advertisers; Vickrey auctions and AdWords; Vickrey Second Price Auctions," located at <http://www.facstaboutadsense.com/vickrey.htm>, last accessed on Feb. 24, 2009, 6 pages.

Lee, K., "Overture's Auto Bid Shifts the Gap," DMNews, Did-it.com, Aug. 22, 2002, located at <http://www.dmnews.com/Overtures-Auto-Bid-Shifts-the-Gap/article/78443>, last accessed on Feb. 25, 2009, 5 pages.

Seda, C., "Perfecting Paid Search Engine Listings-Search," Engine Watch (SEW) SearchEngineWatch.com, Oct. 17, 2002, located at <http://www.searchenginewatch.com/2161001>, last accessed on Feb. 25, 2009, 7 pages.

Sherman, C., "A Closer Look at Overture's Auto Bid System," Oct. 28, 2002, located at <http://www.searchenginewatch.com/2161071/print>, last accessed on Feb. 25, 2009, 3 pages.

Submit Express, "Google reindexes/partners with Ask Jeeves, Overture's Auto Bidding Tool, Teoma Toolbar, FTC," Submit Express Newsletter #56, Jul. 19, 2002, located at <http://www.submitexpress.com/newletters/july_19_02.html>, last accessed on Feb. 25, 2009, 9 pages.

* cited by examiner

RELEASE ADVERTISEMENT SYSTEM

CROSS-REFERENCES TO RELATED APPLICATIONS

This application is a divisional of U.S. patent application Ser. No. 11/692,634, filed on Mar. 28, 2007 of which the full disclosure of this application is incorporated herein by reference for all purposes.

TECHNICAL FIELD

The described technology relates generally to generating advertisements that are keyword-targeted.

BACKGROUND

Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books. When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with an advertisement and search terms. When a search request is received, the search engine service identifies the advertisements whose search terms most closely match those of the search request. The search engine service then displays those advertisements along with the search results. If more advertisements are identified than will fit on the first page of the search results, the search engine service selects to display on the first page those advertisements belonging to the vendors that have offered to pay the highest price (e.g., placed the highest bid) for their advertisements. The search engine services can either charge for placement of each advertisement along with search results (i.e., cost per impression) or charge only when a user actually selects a link associated with an advertisement (i.e., cost per click).

Advertisers would like to maximize the effectiveness of advertising dollars used to pay for advertisements placed along with search results. Thus, advertisers try to identify search term and advertisement combinations that result in the highest benefits (e.g., most profit) to the advertiser. Many techniques have been developed to identify search terms that may be appropriate for advertising various items. For example, some techniques analyze "clickthrough logs" to identify search requests submitted by users and the items of sponsored links that the users selected. If many search requests with a common search term result in users selecting sponsored links for the same item, then a vendor may want to place an advertisement for that item in any search request that contains that search term. Some techniques also select search terms based on "conversion rate" for a search term and an item. A conversion rate is a measure of the percentage of clickthroughs to the item resulting in an actual purchase of the item. Conversion rate, however, is more generally the percentage of clickthroughs that result in some desirable benefit to a vendor or an organization. For example, the conversion rate for an insurance company may be a measure of the percentage of clickthroughs that result in the user requesting a rate quote.

It is important for vendors to have an effective advertisement plan for new release items (i.e., items not yet released or recently released items). If a vendor can effectively advertise new release items (e.g., books, DVDs, or CDs), the vendor can capitalize on the intense consumer demand that often surrounds the release of an item. Traditional techniques such as analyzing clickthrough logs are not particularly effective for new release items. Among other drawbacks, such techniques rely on historical clickthrough patterns, which are not available for new release items.

BRIEF SUMMARY OF THE INVENTION

A new release advertisement system generates advertisement sets for new release items that have a release date. The new release advertisement system provides an item data store that has attributes for the items. The attributes of the items may vary depending on the category of the item. The attributes of the item data store may also include an optional release date. A release date is the date at which an item is available for purchase. To generate the advertisement sets, the system identifies items of the item data store with release dates within a "new release advertising window." The new release advertisement system then identifies item and keyword pairs from the text within the attributes of the items. The system then creates advertisement sets for the pairs that include the advertisement generated for the item of the pair and the keyword of the pair. The advertisement system that submits advertisement sets to advertisement placement services that may give priority to submitting advertisement sets generated by the new release advertisement system. Once the new release advertisement system stops generating advertisement sets for an item that is no longer a new release item, the advertisement system can then select advertisement sets according to its normal advertisement set selection policy.

Other systems, methods, features and/or advantages will be or may become apparent to one with skill in the art upon examination of the following drawings and detailed descrip-

DETAILED DESCRIPTION OF THE INVENTION

Figure 1:
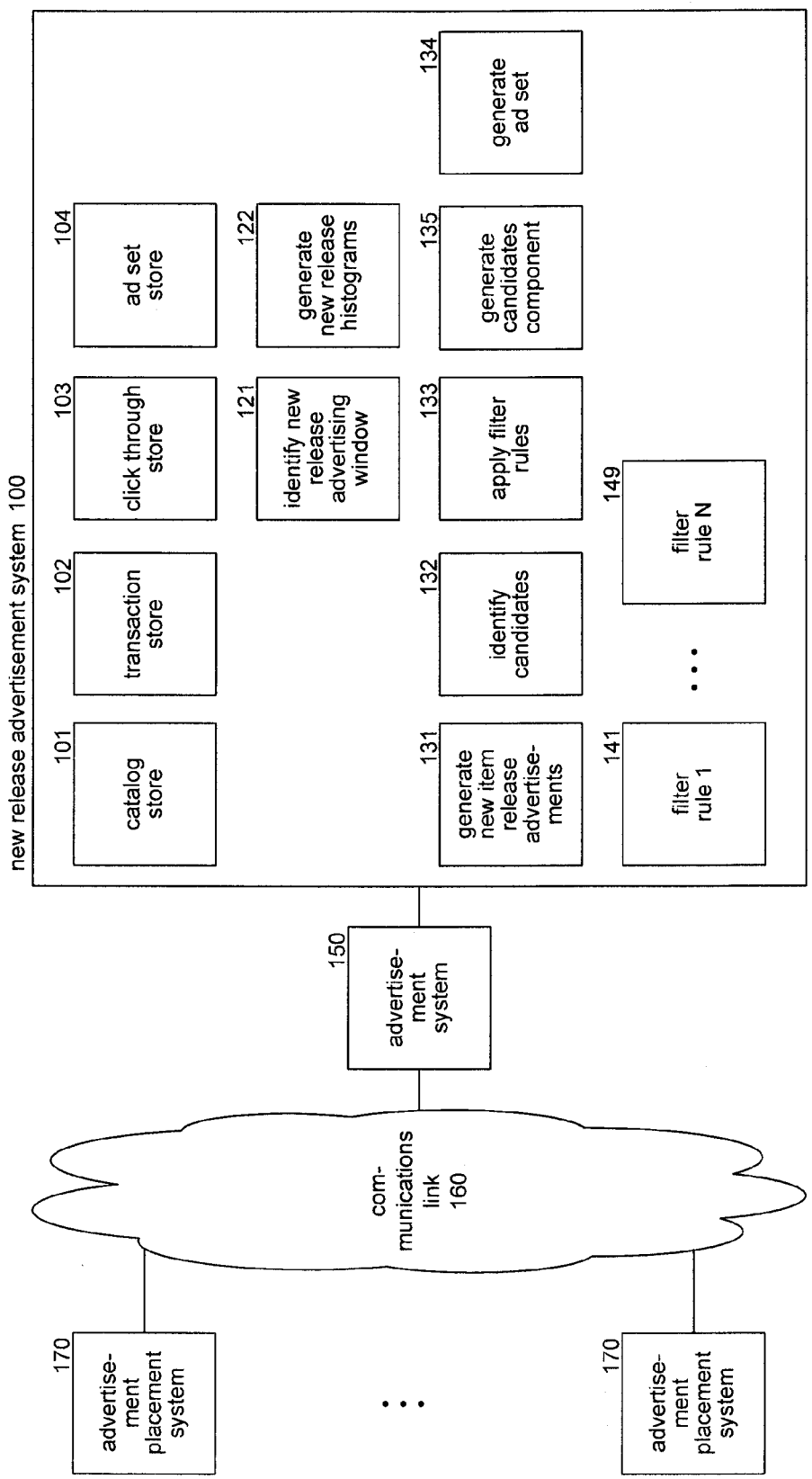
FIG. 1 is a block diagram that illustrates components of a new release advertisement system in one embodiment.

A method and system for identifying keywords for advertising new release items is provided. In one embodiment, the new release advertisement system is implemented as an advertisement generator of an advertisement system that includes multiple advertisement generators that automatically create advertisement sets. An advertisement set contains an advertisement, a search term or keyword, and a link to the advertised item. Different advertisement generators use different algorithms to automatically generate (or "create") advertisements (also referred to as the "creative"), identify search terms, and create links to form advertisement sets. The advertisement system may include an advertisement manager that receives advertisement sets from the advertisement generators, identifies a fee to be associated with each advertisement set, and selects which advertisement sets are to be submitted to various advertisement placement services (e.g., search engine services). In this way, advertisement sets may be automatically generated and automatically submitted to advertising placement services to help achieve an advertiser's objectives. An advertisement system is described in U.S. patent application Ser. No. 10/748,759 entitled "Method and System for Generating Keyword-Targeted Advertisements," which is hereby incorporated by reference.

The new release advertisement system may be used to generate and place advertisements along with any type of content that has associated keywords. Such advertising is referred to as "keyword-targeted advertising." A search term associated with a search result is an example of such a keyword, and the search result is an example of the content. One skilled in the art will appreciate that the new release advertisement system can be used to generate and place advertisements with an advertisement placement service for use in other contexts, such as while content is being streamed to a client, on a web page through which a product can be purchased, on message boards and so on.

In one embodiment, the new release advertisement system (also referred to as "the new release advertisement generator" or "the system") generates advertisement sets for new release items that have a release date. The new release advertisement system provides an item data store that has attributes for the items. For example, an item data store may be an electronic catalog of products (e.g., books and DVDs) sold by a vendor. The attributes of the items may vary depending on the category of the item. For example, a book may have the attributes of title, author, description, price, and so on, and a DVD may have the attributes of title, director, actors, description, rating, price, and so on. The attributes of the item data store may also include an optional release date. A release date is the date at which an item is available for purchase. To generate the advertisement sets, the system identifies items of the item data store with release dates within a "new release advertising window." For example, a new release advertising window may have a start date of two months before the release date and an end date of one month after the release date. With a such a new release advertising window, any items with release dates within the next two months or within the next month are considered to be new release items. The new release advertisement system then identifies item and keyword pairs from the text within the attributes of the items. For example, the new release advertisement system may select each non-noise word of the title of a book and the first and last names of the author of the book as keywords. If the new release advertisement system selects five keywords for an item, then it would have five item and keyword pairs. One skilled in the art will appreciate that many different techniques may be used for identifying keywords from the attributes of an item. For example, a term frequency by inverse document frequency ("tf*idf") metric may be used to identify keywords within description attributes of items. In addition, a "keyword" may include multiple words (e.g., "sorcerer's stone"). After identifying item and keyword pairs for each of the new release items, the system removes pairs that do not satisfy a filtering criterion. For example, some advertisement services do not allow a vendor to place multiple advertisements that specify the same keyword, so duplicate keywords may need to be removed. The system then generates advertisements from the text of the attributes of the items remaining after the removing based on the filtering criterion. The system then creates advertisement sets for the remaining pairs that include the advertisement generated for the item of the pair and the keyword of the pair. The advertisement sets may also include a link to a network-accessible document (e.g., a detailed web page through which the item may be purchased). The system may generate advertisement sets for new release items on a periodic basis (e.g., daily or weekly). The new release advertisement system may also specify an expiration date for each advertisement, which may be the end date of the new release advertising window. The advertisement system that submits advertisement sets to search engines may give priority to submitting advertisement sets generated by the new release advertisement system. Once the new release advertisement system stops generating advertisement sets for an item that is no longer a new release item, the advertisement system can then select advertisement sets according to its normal advertisement set selection policy.

As discussed above, since many advertisement placement services only allow a vendor to specify one advertisement for a keyword, the new release advertisement system may have a filtering criterion ensuring that multiple items do not include the same keywords. For example, when the items are related items in different categories, the new release advertisement system may select only one related item to have the duplicate keyword based on an advertising priority of the categories. For example, related items may include a DVD of a movie and a CD of the movie's soundtrack and have the same keyword of "Harry Potter." In such a case, the system may give a priority to DVDs that is higher than that of CDs under the assumption that consumers are more likely to be interested in new release movies rather than their corresponding soundtracks. The system may select one of multiple unrelated items that have the same keyword based on pricing, projected sales volume, profitability, and so on of the items. In general, the new release advertisement system may apply filtering rules of any nature for determining what item and keyword pairs to remove. For example, a filtering rule may specify that no advertisement sets for items in a certain category (e.g., a low profit category) are to be generated. Another filtering rule may ensure that no duplicate keywords occur in any of the advertisement sets.

In one embodiment, the new release advertisement system may establish a new release advertising window based on analysis of past purchase transactions for items with known release dates. The system may analyze purchase commitment transactions (e.g., purchases of released items or orders for items not yet released) to determine when the level of purchase commitment transactions would make it profitable to start and end advertising new release items as newly released items. To help analyze the purchase commitment transactions, the system may generate histogram data that maps user activity (e.g., clickthroughs and conversions) to various intervals before and after the release date of all items. Histogram data represents a frequency distribution of the underlying data and is referred to herein as a "histogram." For example, the system may use intervals with the length of one day or one week. When using an interval of one day, the system may count the number of clickthroughs for items for each day starting two months before the release date of items and ending three months after the release date of the item. For example, if an item with a release date of January 5 had 10 clickthroughs on January 1, then its contribution to the histogram at delta −4, that is, four days or intervals before the release date, would be 10. If another item with a release date of February 1 had 5 clickthroughs on January 28, then its contribution to the histogram at delta −4 would be 5. Thus, the accumulated contribution for these two items for delta −4 would be 15. The system also may also generate a histogram indicating the number of conversions of items at the various deltas. The system can then calculate the conversion rates for the various deltas before and after the release dates of all items and assess the profitability of when to start and end advertising new release items. The new release advertisement system may use new release advertising windows that are item-specific by generating histograms that are item-specific or specific to similar items. The system may also use new release advertising windows that are category-specific by generating histograms that are category-specific. The system may also use various other metrics when generating a histogram. For example, the system may assess the profitability of each purchase commitment transaction and accumulate an indication of profitability for each delta.

FIG. 1 is a block diagram that illustrates components of the new release advertisement system in one embodiment. The new release advertisement system 100 generates advertisement sets for new release items. An advertisement system 150 calculates appropriate bid amounts for advertisement sets (i.e., for all items including new release items) and submits the advertisement sets to advertisement placement services 170 (e.g., search engine services) for placement via communications link 160. The advertisement system 150 receives advertisement sets from various advertisement generators such as the new release advertisement system. The advertisement system 150 selects advertisement sets and submits them to various advertisement placement services 170. The advertisement system may assign priorities to the advertisement generators and select an advertisement set for a keyword from the advertisement generator with the highest priority that submits an advertisement set with that keyword. For example, the new release advertisement system may have a higher priority than a conventional advertisement generator so that the advertisement set generated by the new release advertisement generator are selected before those of the conventional advertisement generator.

The new release advertisement system accesses a catalog store 101, a transaction store 102, a clickthrough store 103, and an advertisement set store 104. The catalog store may contain an entry for each item that is offered for sale by a vendor. Each entry may include various attributes such as category, title, description, price, release date, and so on. The transaction store may contain an entry for each purchase commitment transaction that indicates the item purchased, price, purchase date, and so on. The clickthrough store may contain an entry for each clickthrough by a user on an advertisement that indicates the date of the clickthrough, the item being advertised, and so on. The advertisement set store contains advertisement sets that have been generated by the various advertisement set generators including the new release advertisement generator.

The new release advertisement system includes an identify new release advertising window component 121 and a generate new release histograms component 122. The identify new release advertising window component invokes the generate new release histograms component 122 to generate various histograms and then analyzes the histograms to identify the start and end dates for a new release advertising window. The new release advertisement system also includes a generate new release advertisements component 131, an identify candidates component 132, an apply filter rules component 133, a generate advertisement set component 134 and a generate candidate component 135. The generate new release advertisements component invokes the identify candidates component to identify candidate item and keyword pairs for generating new release advertisement sets, invokes the apply filter rules component to apply various filters 141-149, and invokes the generate advertisement set component to generate advertisement sets for the item and keyword pairs remaining after applying the filters. The identify candidates component invokes the generate candidate component to generate candidate item and keyword pairs for a new item.

The computing devices on which the new release advertisement system may be implemented may include, among other components, a central processing unit, memory, input devices (e.g., keyboard and pointing devices), output devices (e.g., display devices), and storage devices (e.g., disk drives). The memory and storage devices are computer-readable media that may be encoded with computer-executable instructions that implement functions of the system. In addition, the instructions, data structures, and message structures may be stored or transmitted via a data transmission medium, such as a signal on a communications link. Various communications links may be used, such as the Internet, a local area network, a wide area network, or a point-to-point dial-up connection. The system may be implemented on various computing systems or devices including personal computers, server computers, multiprocessor systems, microprocessorbased systems, network PCs, minicomputers, mainframe computers, distributed computing environments that include any of the above systems or devices, and the like.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The functionality of the components of the system in this description are described to help facilitate an understanding of the system.

Figure 2:
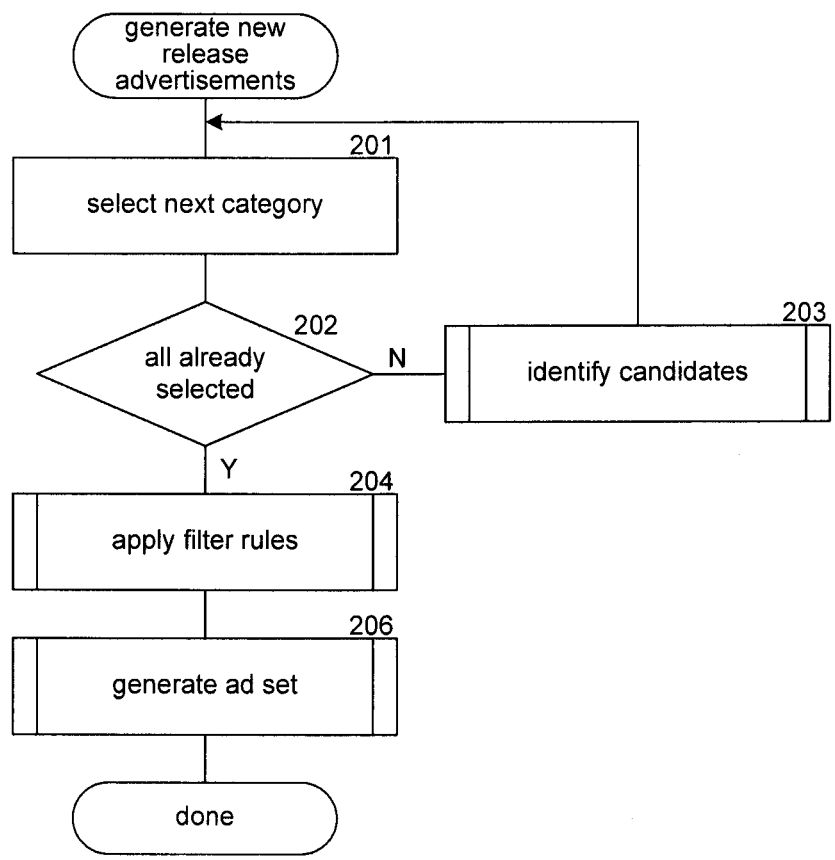
FIG. 2 is a flow diagram that illustrates the processing of the generate new release advertisements component of FIG. 1 in one embodiment.

FIG. 2 is a flow diagram that illustrates the processing of the generate new release advertisements component in one embodiment. The component identifies candidate item and keyword pairs for new release items, applies various filtering rules, and then generates advertisement sets for the remaining item and keyword pairs. In blocks 201-203, the component loops, invoking the identify candidates component for various categories to identify item and keyword pairs for items in the categories. In block 201, the component selects the next category. In decision block 202, if all the categories have already been selected, then the component continues at block 204, else the component continues at block 203. In block 203, the component invokes the identify candidates component to identify candidate item and keyword pairs for the selected category and then loops to block 201 to select the next category. In block 204, the component invokes the apply filter rules component to apply various filter rules to the candidate item and keyword pairs. In block 205, the component invokes the generate advertisement set component to generate an advertisement set for each remaining item and keyword pair. The component then completes.

Figure 3:
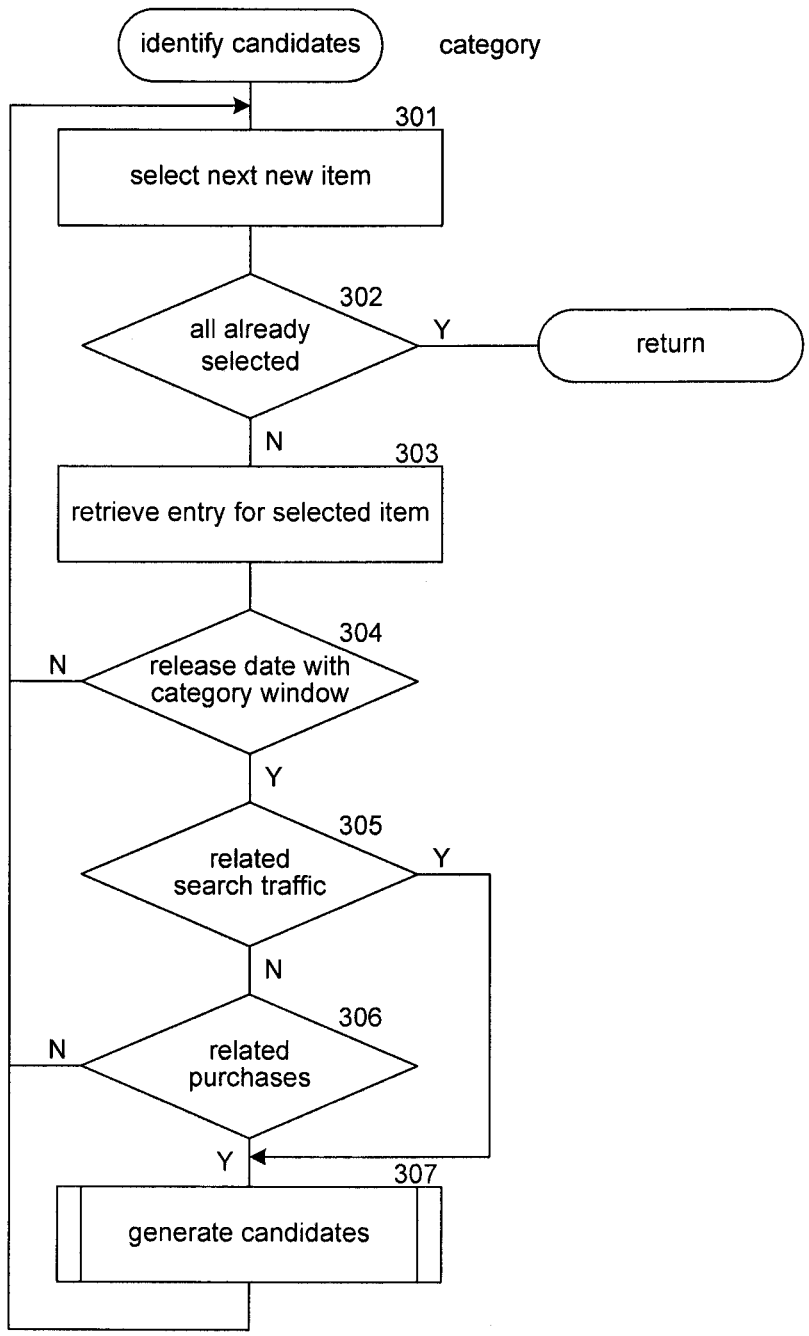
FIG. 3 is a flow diagram that illustrates the processing of the identify candidates component of FIG. 1 in one embodiment.

FIG. 3 is a flow diagram that illustrates the processing of the identify candidates component in one embodiment. The component is passed an indication of a selected category. The component then identifies item and keyword pairs for new release items within that category. In block 301, the component selects the next new item in the passed category. In decision block 302, if all such new items have already been selected, then the component returns, else the component continues at block 303. In block 303, the component retrieves the entry for the selected new item from the catalog store. In decision block 304, if the selected new item has a release date within a category-specific new release advertising window, then it is a new release item and the component continues at block 305, else the component loops to block 301 to select the next new item. In decision block 305, if the selected new item has had at least some traffic (e.g., via clickthroughs as a result of user-submitted queries), then the component continues at block 307, else the component continues at block 306. In decision block 306, if there have been purchase commitment transactions for the selected new item, then the component continues at block 307, else the component loops to block 301 to select the next new item. Decision blocks 305 and 306 help ensure that advertisements are generated only for new release items in which users have expressed some level of interest. One skilled in the art will appreciate that a level of interest can be expressed in many different ways. For example, a level of interest in an item may be expressed by the purchase of a related item (e.g., purchase of a CD of a soundtrack of a movie may express a level of interest in the DVD of the movie). In block 307, the component invokes a generate candidates component to generate the candidate item and keyword pairs for the selected new item and then loops to block 301 to select the next new item.

Figure 4:
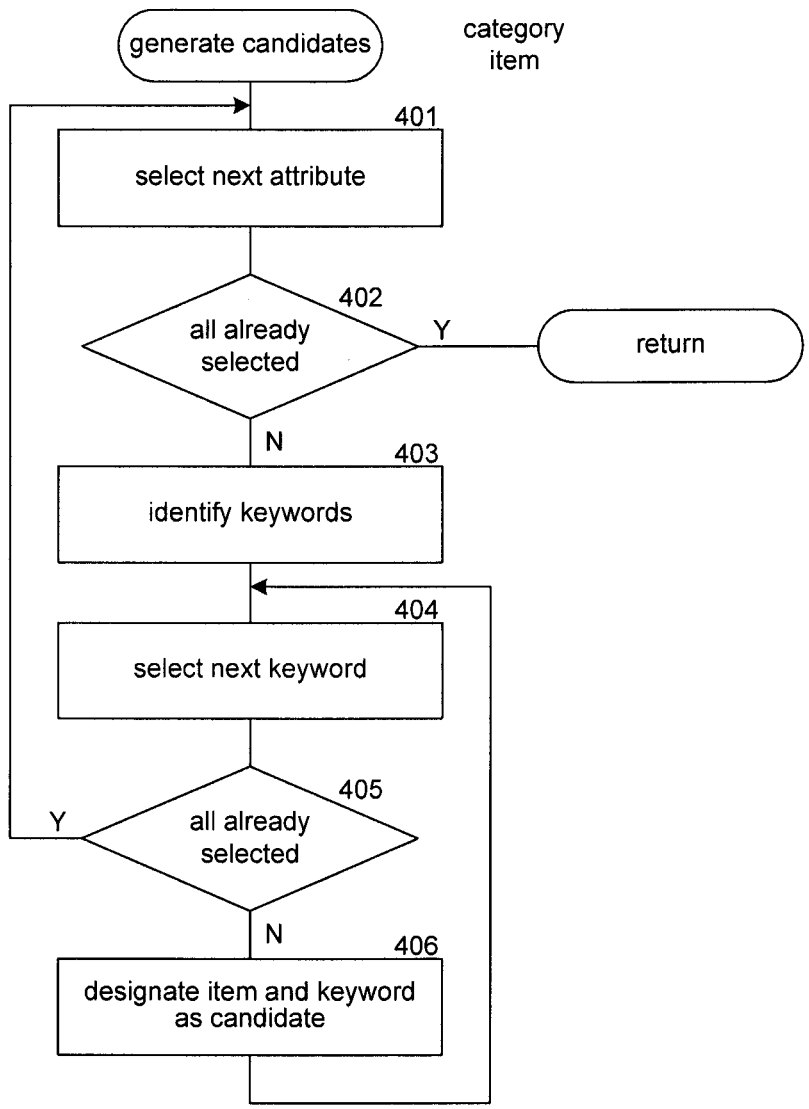
FIG. 4 is a flow diagram that illustrates the processing of the generate candidates component of FIG. 1 in one embodiment.

FIG. 4 is a flow diagram that illustrates the processing of the generate candidates component in one embodiment. The component is passed a category and a new item entry and generates item and keyword pairs for the new item. The component uses the category to determine from which attributes of the entry to extract keywords. In block 401, the component selects the next attribute for the category from which keywords are to be extracted. In block 402, if all the attributes have already been selected, then the component returns, else the component continues at block 403. In block 403, the component identifies various keywords from the selected attribute of the passed new item entry. In blocks 404-406, the component loops generating an item and keyword pair for each identified keyword. In block 404, the component selects the next keyword. In decision block 405, if all the identified keywords have already been selected, then the component loops to block 401 to select the next attribute, else the component continues at block 406. In block 406, the component designates the item and the selected keyword as a candidate item and keyword pair and then loops to block 404 to select the next keyword.

Figure 5:
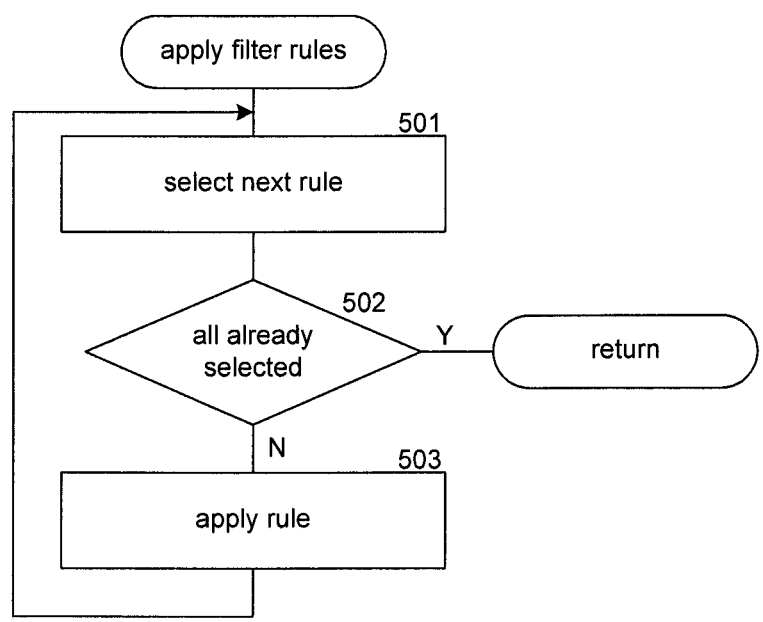
FIG. 5 is a flow diagram that illustrates the processing of the apply filter rules component of FIG. 1 in one embodiment.

FIG. 5 is a flow diagram that illustrates the processing of the apply filter rules component in one embodiment. The component loops invoking various filter rules to remove as candidates those item and keyword pairs that satisfy the rule. In block 501, the component selects the next rule. In decision block 502, if all the rules have already been selected, then the component returns, else the component continues at block 503. In block 503, the component applies the selected rule and then loops to block 501 to select the next rule.

Figure 6:
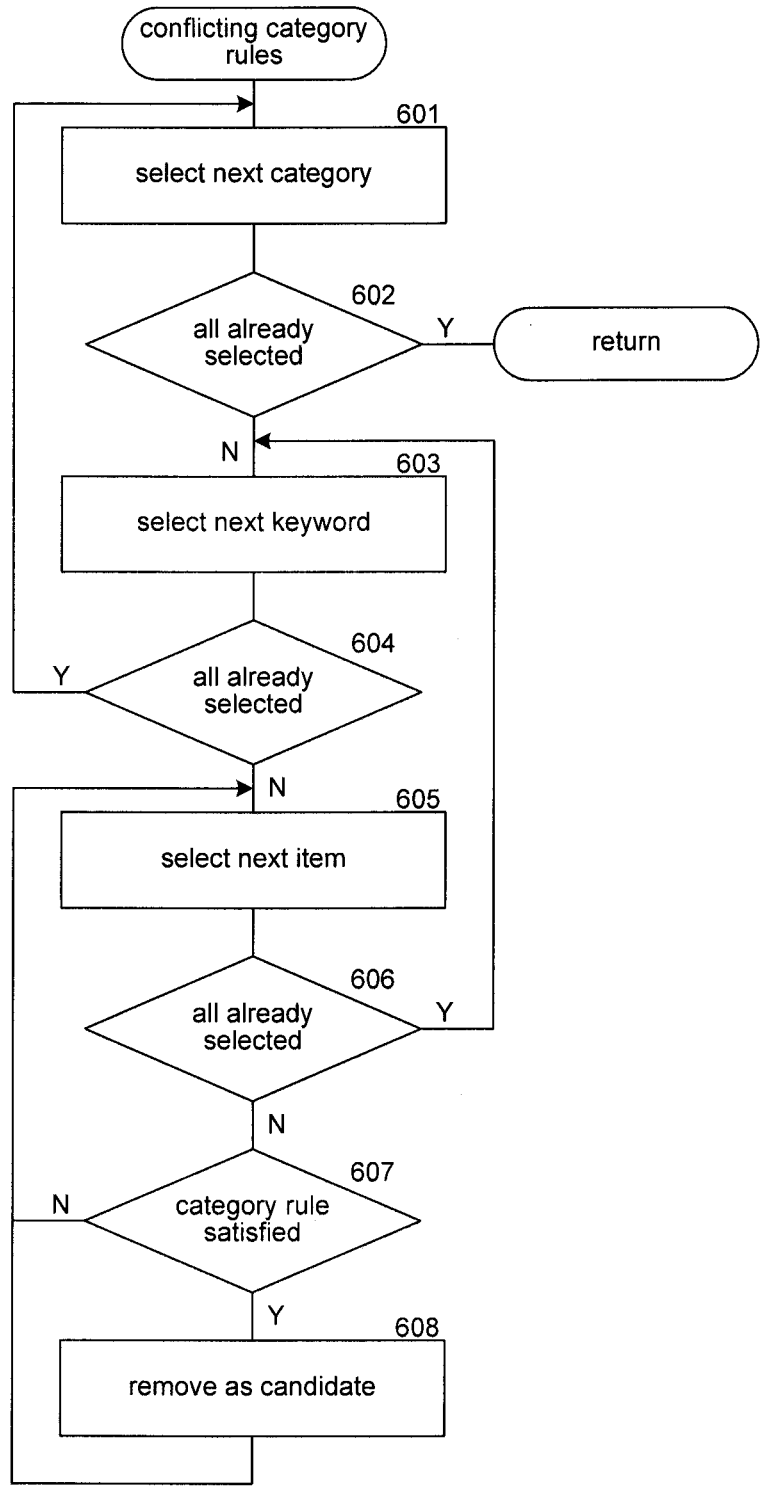
FIG. 6 is a flow diagram that illustrates the processing of an example filter rule in one embodiment.

FIG. 6 is a flow diagram that illustrates the processing of an example filter rule in one embodiment. In this example, the filter rule removes candidate item and keyword pairs with duplicate keywords and with items in the same category according to rules that may be category-specific. For example, each category may have a rule that ensures there are no duplicate keywords in that category and that specifies how to select the item that is to have that keyword. For example, candidate item and keyword pairs may be a DVD, for a movie entitled "Harry Potter and the Sorcerer's Stone" and the keyword "stone" and a DVD for a movie entitled "Romancing the Stone" and the keyword "stone." Since both items are in the same category "DVD," a filter rule may be used to remove the pair that is farthest away from the release date or that is the least expensive. This filter rule allows the new release advertisement generator to control the selection of what item is advertised for a keyword, rather than leaving a more general advertisement placement system to select the item based on more general rules. In block 601, the component selects the next category. In decision block 602, if all the categories have already been selected, then the component returns, else the component continues at block 603. In block 603, the component selects the next keyword (e.g., "stone") used in any item and keyword pair of the selected category. In decision block 604, if all such keywords have already been selected, then the component loops to block 601 to select the next category, else the component continues at block 605. In block 605, the component loops selecting the next item (e.g., DVD of the Sorcerer's Stone or the DVD of Romancing the Stone) in the selected category that is the item of an item and keyword pair with the selected keyword. In decision block 606, if all such items have already been selected, then the component loops to block 603 to select the next keyword, else the component continues at block 607. In decision block 607, if a category-specific rule is satisfied for the selected item (e.g., DVD of Romancing the Stone), then the component continues at block 608, else the component loops to block 605 to select the next item. In block 608, the component removes the item and keyword pair (e.g., DVD of Romancing the Stone and "stone") corresponding to the selected item and keyword as a candidate and then loops to block 605 to select the next item.

Figure 7:
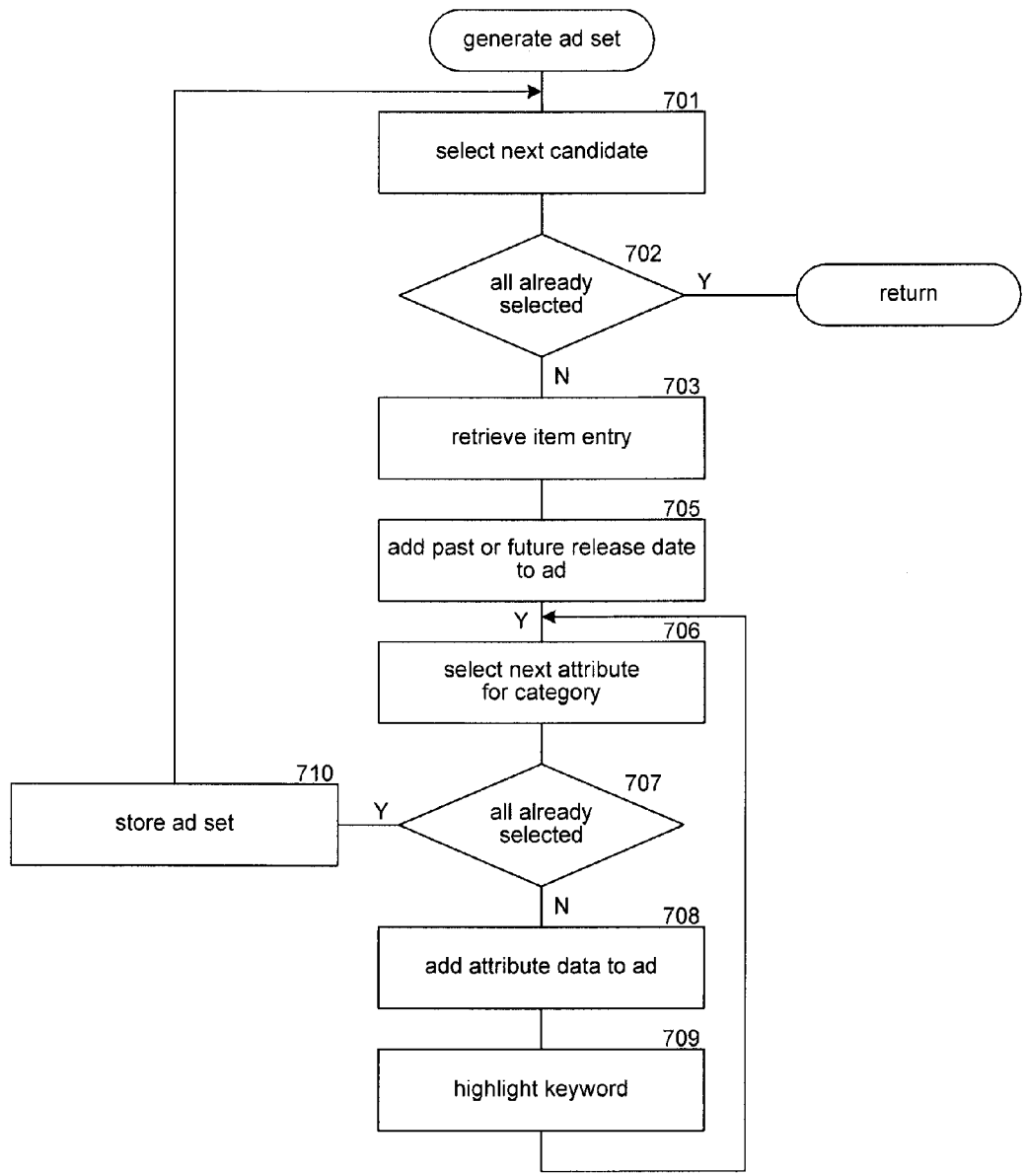
FIG. 7 is a flow diagram that illustrates the processing of the generate advertisement set component of FIG. 1 in one embodiment.

FIG. 7 is a flow diagram that illustrates the processing of the generate advertisement set component in one embodiment. The component generates advertisement sets for the candidate item and keyword pairs remaining after the filtering has been applied. In block 701, the component selects the next candidate item and keyword pair. In decision block 702, if all the candidates have already been selected, then the component returns, else the component continues at block 703. In block 703, the component retrieves the entry for the item of the selected candidate item and keyword pair. The component may also initialize the advertisement in a way that is appropriate for the category of the selected item. For example, if the category is DVD, the initial advertisement may include a statement such as "DVDs that may be of interest include." In block 705, the component adds the release date indicating whether the item has already been released or has not yet been released to the advertisement that is being generated for the advertisement set. The release date of the advertisement may help a user decide whether or not to clickthrough the advertisement. For example, if the user is looking for a DVD of a movie to watch in the next couple of days, the user may not be interested in a DVD with a distant release date. In blocks 706-709, the component loops adding words from the attributes of the item entry to the advertisement. In block 706, the component selects the next attribute for the category of the item. In decision block 707, if all the attributes have already been selected, then the component continues at block 710, else the component continues at block 708. In block 708, the component adds data of the attribute to the advertisement. For example, if the item is a book and the attribute is title, then the component may add the entire title. If the title is, however, too long to fit into the advertisement, the component may use an algorithm to truncate the title. In block 709, if the data added to the advertisement includes the keyword of the selected candidate item and keyword pair, then the component highlights the keyword. The component then loops to block 706 to select the next attribute. In block 710, the component stores the generated advertisement set in the advertisement set store and then loops to block 701 to select the next candidate. The component may add to each advertisement a link to an electronic document on the vendor's system that can be used to purchase or pre-order the item.

Figure 8:
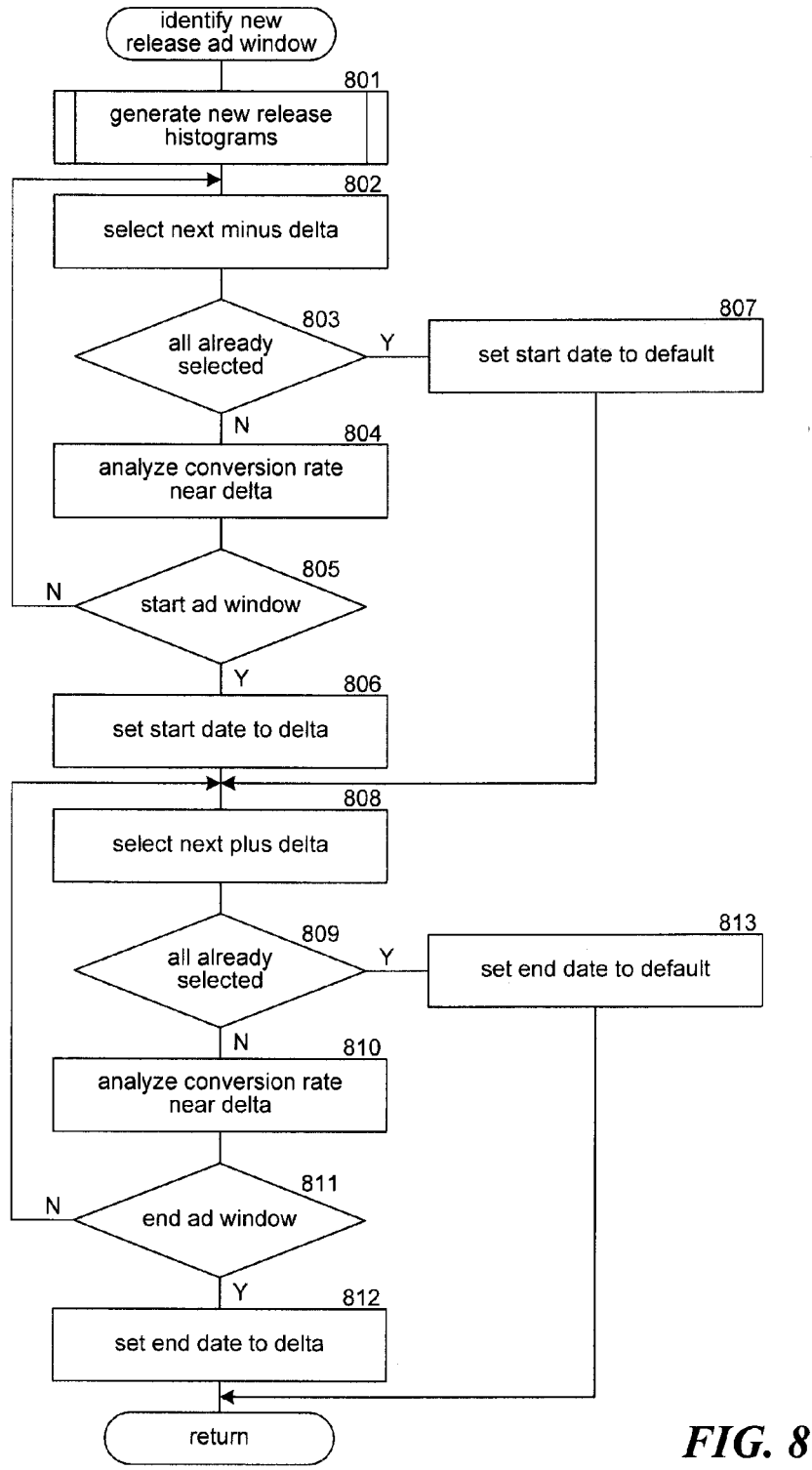
FIG. 8 is a flow diagram that illustrates the processing of the identify new release advertising window component in one embodiment.

FIG. 8 is a flow diagram that illustrates the processing of the identify new release advertising window component in one embodiment. The component generates new release histograms and identifies a start and end date for a new release advertising window. In block 801, the component invokes the generate new release histograms component to generate a clickthrough histogram and a conversion histogram. In blocks 802-807, the component loops, establishing the start date for the new release advertising window. In block 802, the component selects the next delta before the release date, starting with the release date. In decision block 803, if all the deltas have already been selected, then the component continues at block 807, else the component continues at block 804. In block 804, the component analyzes the conversion rate near the selected delta using the histograms to assess the profitability of setting the start date based on the selected delta. In decision block 805, if the analysis indicates that the new release advertising window should start at the selected delta, then the component continues at block 806, else the component loops to block 802 to select the next delta before the release date. In block 806, the component sets the start date of the new release advertising window to the selected delta and then continues at block 808. In block 807, an appropriate start date was not identified, so the component initializes the start date to a default delta and continues at block 808. In blocks 808-813, the component loops, establishing the end date for the new release advertising window. In block 808, the component selects the next delta after the release state. In decision block 809, if all the deltas have already been selected, then the component continues at block 813, else the component continues at block 810. In block 810, the component analyzes the conversion rate near the selected delta using the histograms to assess the profitability of setting the end date based on the selected delta. In decision block 811, if the analysis indicates to set the end date at the selected delta, then the component continues at block 812, else the component loops to block 808 to select the next delta. In block 812, the component sets the end date of the new release advertising window to the selected delta and returns. In block 813, an appropriate end date was not identified and the component initializes the end date to a default delta and returns.

Figure 9:
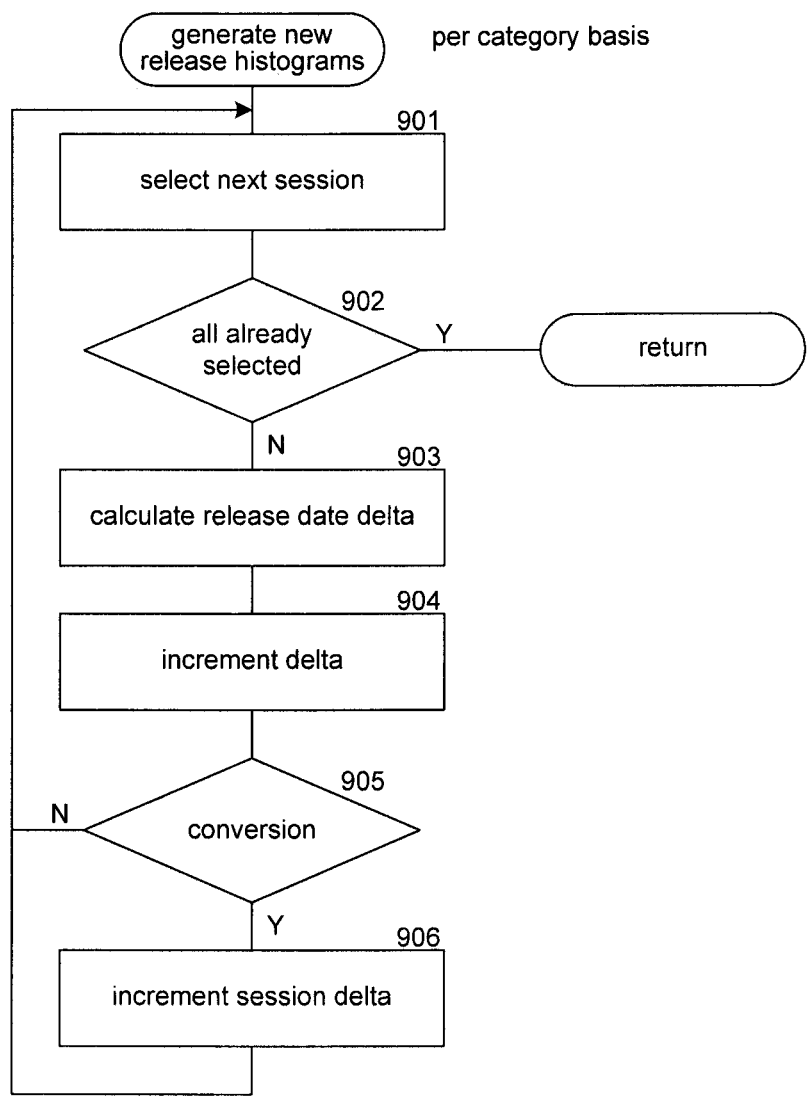
FIG. 9 is a flow diagram that illustrates the processing of the generate new release histograms component in one embodiment.

FIG. 9 is a flow diagram that illustrates the processing of the generate new release histograms component in one embodiment. The component generates a clickthrough histogram and a conversion histogram. In block 901, the component selects the next user session that relates to a new release item. In decision block 902, if all the sessions have already been selected, the component returns the histograms, else the component continues at block 903. A session is generally a sequence of interactions by a user within a certain time period with a web site of a vendor. A session may also be delimited by a user logging on to and off of a vendor's web site. In block 903, the component identifies the item of the session and calculates the delta of the date of the session from the release date of the item. In block 904, the component increments the clickthrough histogram for the calculated delta. In decision block 905, if the session resulted in a purchase commitment transaction, the component continues at block 906, else the component loops to block 901. In block 906 the component increments the conversion histogram at the calculated delta. The component then loops to block 901 to select the next session.

One skilled in the art will appreciate that, although specific embodiments of the new release advertisement system have been described herein for purposes of illustration, various modifications may be made without deviating from the spirit and scope of the invention. The term "item" includes any product, service, or concept that can be advertised. In addition, an advertisement set may not have a link associated with it. An advertiser may want to simply display the information of an advertisement to users who submit requests using a certain search term. The new release advertisement system may generate during each execution advertisement sets for only those items whose release date was not within the new release advertising window during the last execution. The new release advertising system may also remove advertisement sets whose items are no longer within the new release advertising window. Accordingly, the invention is not limited except by the appended claims.

What is claimed is:

1. A computer-implemented method for establishing a new release advertising window, the method comprising:
analyzing, by at least one computing device, purchase commitment transactions of items over time periods before release dates of the items at least in part by generating one or more histograms that measure at least one of (a) a number of clickthroughs associated with said items or (b) a number of conversions associated with said items;

for each of a plurality of delta time intervals before a release date of an item, analyzing, by the at least one computing device, the one or more histograms at the delta time interval to assess a profitability associated with the delta time interval; and selecting, by the at least one computing device, at least one of the plurality of delta time intervals and setting a new release advertising window to start at the selected delta time interval before the release date based at least in part on the profitability indicating that it will be profitable to start advertising new release items at the delta time interval before the release date.

2. The computer-implemented method of claim 1, wherein analyzing purchase commitment transactions of items includes determining profitability of advertising for the items with new release advertising windows of different start deltas based on conversion rates associated with advertisements.

3. The computer-implemented method of claim 1, wherein analyzing purchase commitment transactions of items includes averaging conversion rates of advertising for the items at different deltas.

4. The computer-implemented method of claim 1, wherein the new release advertising window is specific to a category of items.

5. The computer-implemented method of claim 1, wherein analyzing purchase commitment transactions of items includes:

analyzing purchase commitment transactions after the release dates of the items; and setting an end date of the new release advertising window to a time after the release date based on analysis of the purchase commitment transactions indicating that it will be more profitable to stop advertising the item at said time after the release date as a newly released item.

6. The computer-implemented method of claim 1, wherein the purchase commitment transactions include purchasing or ordering an item.

7. A non-transitory computer-readable storage medium for storing computer-executable instructions for controlling a computing device for establishing a new release advertising window, by a method comprising:

analyzing purchase commitment transactions of items over time periods before release dates of the items at least in part by generating one or more histograms that measure at least one of (a) a number of clickthroughs associated with said items or (b) a number of conversions associated with said items;

for each of a plurality of delta time intervals before a release date of an item, analyzing the one or more histograms at the delta time interval to assess a profitability associated with the delta time interval; and selecting at least one of the plurality of delta time intervals and setting a new release advertising window to start at the selected delta time interval before the release date based at least in part on the profitability indicating that it will be profitable to start advertising new release items at the delta time interval before the release date.

8. The non-transitory computer-readable storage medium of claim 7, wherein analyzing purchase commitment transactions of items includes determining profitability of advertising for the items with new release advertising windows of different start deltas based on conversion rates associated with advertisements.

9. The non-transitory computer-readable storage medium of claim 7, wherein analyzing purchase commitment transactions of items includes averaging conversion rates of advertising for the items at different deltas.

10. The non-transitory computer-readable storage medium of claim 7, wherein the new release advertising window is specific to a category of items.

11. The non-transitory computer-readable storage medium of claim 7, wherein analyzing purchase commitment transactions of items includes:

analyzing purchase commitment transactions after the release dates of the items; and setting an end date of the new release advertising window to a time after the release date based on analysis of the purchase commitment transactions indicating that it will be more profitable to stop advertising the item at said time after the release date as a newly released item.

12. The non-transitory computer-readable storage medium of claim 7, wherein the purchase commitment transactions include purchasing or ordering an item.

13. A computer system for establishing a new release advertising window comprising:

a processor; and a memory for storing computer-executable instructions that, when executed on the processor, cause the processor to:

analyze purchase commitment transactions of items over time periods before release dates of the items at least in part by generating one or more histograms that measure at least one of (a) a number of clickthroughs associated with said items or (b) a number of conversions associated with said items;

for each of a plurality of delta time intervals before a release date of an item, analyze the one or more histograms at the delta time interval to assess a profitability associated with the delta time interval; and select at least one of the plurality of delta time intervals and set a new release advertising window to start at the selected delta time interval before the release date based at least in part on the profitability indicating that it will be profitable to start advertising new release items at the delta time interval before the release date.

14. The computer system of claim 13, wherein the computer-executable instructions that cause the processor to analyze purchase commitment transactions of items over time periods before the release dates of the items further cause the processor to determine profitability of advertising for the items with new release advertising windows of different start deltas based on conversion rates associated with advertisements.

15. The computer system of claim 13, wherein the computer-executable instructions that cause the processor to analyze purchase commitment transactions of items over time periods before the release dates of the items further cause the processor to average conversion rates of advertising for the items at different deltas.

16. The computer system of claim 13, wherein the new release advertising window is specific to a category of items.

17. The computer system of claim 13, wherein the computer-executable instructions that cause the processor to analyze purchase commitment transactions of items over time periods before the release dates of the items further cause the processor to:

analyze purchase commitment transactions after the release dates of the items; and set an end date of the new release advertising window to a time after the release date based on analysis of the purchase commitment transactions indicating that it will be more profitable to stop advertising the item at said time after the release date as a newly released item.

18. The computer system of claim 13, wherein the purchase commitment transactions include purchasing or ordering an item.

19. The computer-implemented method of claim 1, wherein the computer-executable instructions that cause the processor to analyze purchase commitment transactions of items over time periods before the release dates of the items further cause the processor to determine profitability of advertising for the items with new release advertising windows of different start deltas based on clickthroughs associated with advertisements.

20. The method of claim 1, wherein the new release advertising window is specific to similar items.

\* \* \* \* \*